(12) United States Patent
Deng et al.

(10) Patent No.: US 9,838,623 B2
(45) Date of Patent: Dec. 5, 2017

(54) GLOBAL SHUTTER CONTROL SIGNAL GENERATOR WITH REDUCED DRIVING REQUIREMENTS

(71) Applicant: OMNIVISION TECHNOLOGIES, INC., Santa Clara, CA (US)

(72) Inventors: Liping Deng, Cupertino, CA (US); Zhiqiang Song, San Jose, CA (US); Pengting Zhang, Shanghai (CN); Yi Liu, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 210 days.

(21) Appl. No.: 14/939,862

(22) Filed: Nov. 12, 2015

(65) Prior Publication Data

US 2017/0142355 A1  May 18, 2017

(51) Int. Cl.
*H04N 5/353* (2011.01)
*H04N 5/378* (2011.01)

(52) U.S. Cl.
CPC .......... *H04N 5/3532* (2013.01); *H04N 5/378* (2013.01)

(58) Field of Classification Search
CPC .. H04N 5/3591; H04N 5/3698; H04N 5/3745; H04N 5/378; H04N 5/3532
USPC ........................................................ 348/296
See application file for complete search history.

(56) References Cited

U.S. PATENT DOCUMENTS

| 7,332,786 | B2 | 2/2008 | Altice, Jr. et al. | |
| 2009/0236644 | A1 | 9/2009 | Adkisson et al. | |
| 2010/0231771 | A1 | 9/2010 | Yaghmai | |
| 2010/0276574 | A1* | 11/2010 | Manabe | H04N 5/353 250/214 A |
| 2011/0221723 | A1 | 9/2011 | Kurokawa et al. | |
| 2015/0319386 | A1 | 11/2015 | Brady et al. | |
| 2016/0165165 | A1* | 6/2016 | Chen | H04N 5/3741 348/308 |
| 2016/0307949 | A1* | 10/2016 | Madurawe | H04N 5/3698 |
| 2017/0223289 | A1* | 8/2017 | Inui | H04N 5/3591 348/241 |

OTHER PUBLICATIONS

ROC (Taiwan) Pat. Application No. 105118962—Office Action and Search Report with English Translation, 6 pages.

\* cited by examiner

*Primary Examiner* — Antoinette Spinks
(74) *Attorney, Agent, or Firm* — Christensen O'Connor Johnson Kindness PLLC

(57) ABSTRACT

A pixel cell includes a photodiode disposed in a semiconductor material to accumulate image charge in response to light. A global shutter transistor is disposed in the semiconductor material and is selectively resets the image charge in the photodiode in response to a global shutter control signal. A global shutter control signal generator circuit is coupled to generate the global shutter control signal to have a first value, a second value, and a third value. The first value of the global shutter control signal is coupled to turn on the global shutter transistor to reset the photodiode. The third value of the global shutter control signal is coupled to control the global shutter transistor to be in a low leakage off mode. The second value of the global shutter control signal is between the first and third values and is turns off the global shutter transistor.

19 Claims, 2 Drawing Sheets

GLOBAL SHUTTER CONTROL SIGNAL GENERATOR WITH REDUCED DRIVING REQUIREMENTS

BACKGROUND INFORMATION

Field of the Disclosure

The present invention relates generally image sensors. More specifically, examples of the present invention are related to image sensor pixel cells having global shutters.

Background

For high-speed image sensors, a global shutter can be used to capture fast-moving objects. A global shutter typically enables all pixel cells in the image sensor to simultaneously capture the image. For slower moving objects, the more common rolling shutter is used. A rolling shutter normally captures the image in a sequence. For example, each row within a two-dimensional ("2D") pixel cell array may be enabled sequentially, such that each pixel cell within a single row captures the image at the same time, but each row is enabled in a rolling sequence. As such, each row of pixel cells captures the image during a different image acquisition window. For slow moving objects, the time differential between each row can generate image distortion. For fast-moving objects, a rolling shutter can cause a perceptible elongation distortion along the object's axis of movement.

In global shutter image sensor, all pixel cells are initialized with a reset voltage (e.g., AVDD) prior starting a normal exposure operation. This reset is typically realized by connecting every pixel to an AVDD voltage through a global shutter switch. After reset, the global shutter switch in each pixel is turned off, which then enables each pixel to begin a normal exposure operation.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
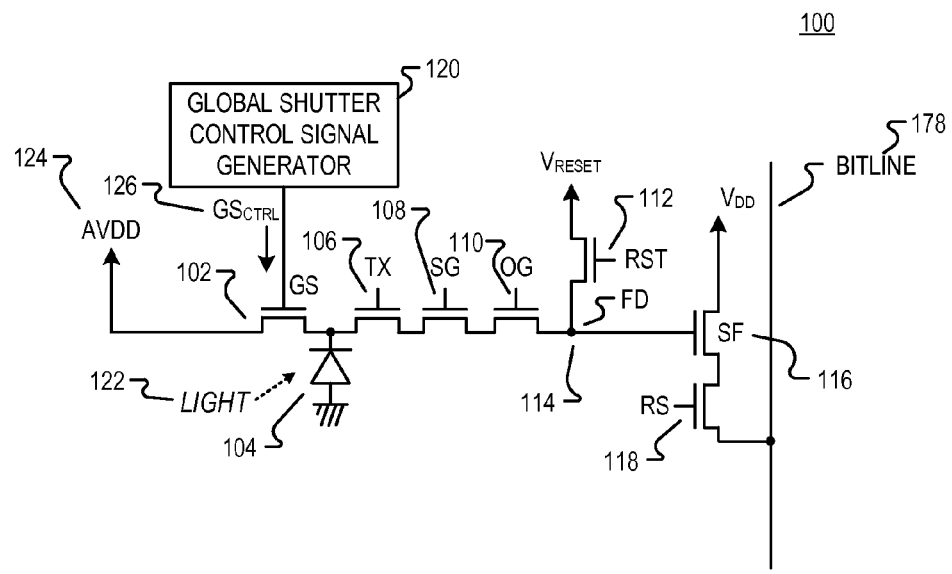
FIG. 1 is a schematic illustrating one example of a pixel cell including global shutter control signal generator that provides a global shutter control signal to a global shutter switch in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

As will be shown, methods and apparatuses directed to a global shutter control signal generator that provides a global shutter control signal to a global shutter switch in a pixel cell are disclosed. In the following description, numerous specific details are set forth in order to provide a thorough understanding of the present invention. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," an embodiment, "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. The following is a detailed description of the terms and elements used in the description of examples of the present invention by referring to the accompanying drawings.

As will be discussed, for a global shutter switch that is implemented using an NMOS transistor, the gate terminal of the NMOS transistor can be connected to a negative NVDD voltage (e.g., −2 volts) to provide a low leakage off mode when the global shutter switch is turned off, which improves image sensor performance. As such, the NMOS gate voltage is changed from AVDD to NVDD when the global shutter switch transitions from being turned on to being turned off. For instance, in an example in which AVDD=3 volts and NVDD=−2 volts, the voltage on the gate terminal of the global shutter switch transitions from 3 volts to −2 volts when being turned off. In order to provide the negative NVDD voltage (e.g., −2 volts), a negative voltage generator, which may also be referred to as an N-pump or negative pump, is provided. In order to turn off the global shutter switch in every pixel cell of an image sensor simultaneously to implement a global shutter, a typical N-pump would need needs to have a very large driving capability in order to drive all of the gate terminals of the global shutter switches. Indeed, the line capacitance coupled to the gate terminals of all of the global shutter switches could be very large, which in some examples could be in the order of nanofarads depending on number of pixels in the pixel array of an image sensor. However, examples in accordance with the teachings of the present invention provide a global shutter control signal generator with reduced drive requirements, and therefore reduce the need of an N-pump with a large drive capability.

To illustrate, FIG. 1 is a schematic illustrating one example of a pixel cell 100 with a global shutter controlled with a global shutter control signal generator 120 in accordance with the teachings of the present invention. In the example, pixel cell 100 may be one of a plurality of pixel cells in a pixel array. As shown in the depicted example, pixel cell 100 includes a global shutter transistor 102, a photodiode 104, a transfer transistor 106, a storage transistor 108, an output transistor 110, a readout node 114, a reset transistor 112, an amplifier transistor 116, and a row select transistor 118 coupled to a bitline 178. In one example, the readout node 114 is a floating diffusion disposed in the semiconductor material of pixel cell 100. In one example, the amplifier transistor 116 is implemented with a source follower coupled transistor. As shown in the example of FIG. 1, global shutter transistor 102 is coupled between an AVDD voltage and photodiode 104.

In operation, the global shutter transistor 102 is coupled to selectively deplete the image charge that has accumulated in the photodiode 104 prior to a normal exposure operation by selectively coupling the photodiode 104 to voltage AVDD in response to a global shutter control signal $GS_{CTRL}$ 126, which is generated by global shutter control signal generator 120. In the example, all pixel cells 100 included in a pixel array of an image sensor share the global shutter control signal $GS_{CTRL}$ 126 to implement a global shutter. The photodiode 104 is disposed in the semiconductor material of pixel cell 100 to accumulate image charge in response to incident light 122 directed to the photodiode 104 during a normal exposure operation after the global shutter switch 102 is turned off. In one example, the incident light 122 may be directed through a front side of the semiconductor material of pixel cell 100. In another example, it is appreciated that the incident light 122 may be directed through a backside of the semiconductor material of pixel cell 100. After the normal exposure operation, the image charge that is accumulated in photodiode 104 is transferred to an input of the storage transistor 108 through transfer transistor 106.

The example in FIG. 1 also illustrates that output transistor 110 is coupled to an output of the storage transistor 108 to selectively transfer the image charge from the storage transistor 108 to readout node 114, which in the illustrated example is a floating diffusion FD. A reset transistor 112 is coupled between a reset voltage $V_{RESET}$ and the readout node 114 to selectively reset the charge in the readout node 114 in response to a reset signal RST. In the example, amplifier transistor 116 includes an amplifier gate coupled to the readout node 114 to amplify the signal on readout node 114 to output image data from pixel cell 100. Row select transistor 118 is coupled between bitline 178 and the amplifier transistor 116 to output the image data to bitline 178.

Figure 2:
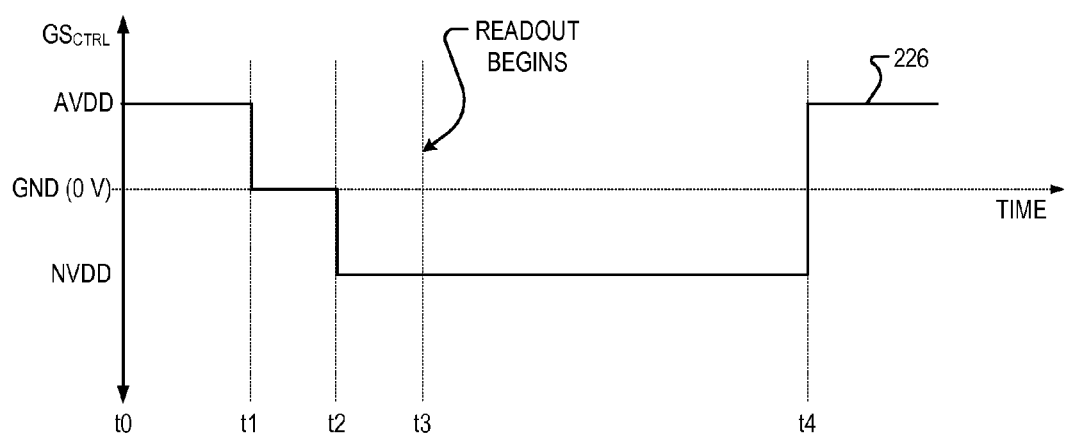
FIG. 2 is a timing diagram illustrating an example global shutter control signal having a first value, a second value, and a third value to control a global shutter switch in accordance with the teachings of the present invention.

FIG. 2 is a timing diagram illustrating an example global shutter control signal $GS_{CTRL}$ 226 having a first value AVDD, a second value GND, and a third value NVDD to control a global shutter switch in accordance with the teachings of the present invention. In the depicted example, it is appreciated that global shutter control signal $GS_{CTRL}$ 226 of FIG. 2 may be one of example of global shutter control signal 126 generated by global shutter control signal generator 120 of FIG. 1, and that similarly named and numbered elements referenced below are coupled and function similar to as described above. Accordingly, elements in FIG. 1 may be also referred to below for explanation purposes.

In one example, AVDD may be equal to 3 volts, GND represents ground and is therefore equal to 0 volts, and NVDD is equal to −2 volts. It is appreciated of course that in other examples, AVDD and NVDD may have different values in accordance with the teachings of the present invention, and that the example voltages described herein are provided for explanation purposes.

As shown in the example of FIG. 2, at time t0, the global shutter control signal $GS_{CTRL}$ 226 is equal to AVDD, which turns on global shutter transistor 102 and resets the image charge in photodiode 104. During the time period between time t0 and t1, global shutter control signal $GS_{CTRL}$ 226 remains substantially equal to AVDD as shown such that global shutter transistor 102 remains on between time t0 and t1. At time t1, global shutter control signal $GS_{CTRL}$ 226 transitions from AVDD to GND, which turns off global shutter transistor 102. During the time period between time t1 and t2, global shutter control signal $GS_{CTRL}$ 226 remains substantially equal to GND as shown such that global shutter transistor 102 remains off between time t1 and t2. Later, at time t2, global shutter control signal $GS_{CTRL}$ 226 then transitions from GND to NVDD, which transitions global shutter transistor 102 to a low leakage off mode. It is appreciated that when the global shutter transistor 102 is off after time t1, a normal exposure operation begins, at which time image charge may be accumulated in photodiode 104 in response to incident light 122.

Continuing with the example shown in FIG. 2, at time t3, a readout operation may begin, after which time transfer transistor 106 may transfer the image charge accumulated in in photodiode 104 to storage transistor 108, which may then eventually be readout through output transistor 110, amplifier transistor 116, and row select transistor 118 to bitline 178, as discussed above. In the example depicted in FIG. 2, at time t4, global shutter control signal $GS_{CTRL}$ 226 transitions from NVDD back to AVDD to turn global shutter transistor 102 back on, which reinitializes the image charge in photodiode 104 before a next normal exposure operation. During the time period between time t2 and t4, global shutter control signal $GS_{CTRL}$ 226 remains substantially equal to NVDD as shown such that global shutter transistor 102 remains in the low leakage off mode between time t2 and t4.

It is appreciated that by transitioning global shutter control signal $GS_{CTRL}$ 226 from AVDD to an intermediate voltage GND at time t1, and then later transitioning global shutter control signal $GS_{CTRL}$ 226 from GND to the negative voltage NVDD at time t2, the N-pump that provides the negative NVDD voltage for global shutter control signal $GS_{CTRL}$ 226 does not require a large driving capability in accordance with the teachings of the present invention. In other words, instead of having to drive all of the gate terminal voltages from AVDD directly to NVDD, global shutter control signal $GS_{CTRL}$ 226 first drives the gate terminals to GND at time t1, and then later to NVDD at time t2. In one example, the delay between time t1 and time t2 may be equal to at least one row readout time of a pixel array including the pixel cell 100. In other words, in one example, the delay between time t1 and t2 may be equal to one or two row readout times of a pixel array that includes pixel cell 100 in accordance with the teachings of the present invention. In this way, the N-pump drive requirements to generate global shutter control signal $GS_{CTRL}$ 226 are reduced significantly (e.g., a more than 50% drive requirement reduction if AVDD=3 volts and NVDD=−2 volts) by transitioning from AVDD to GND, and then changing from GND to NVDD, as discussed above in accordance with the teachings of the present invention.

Figure 3:
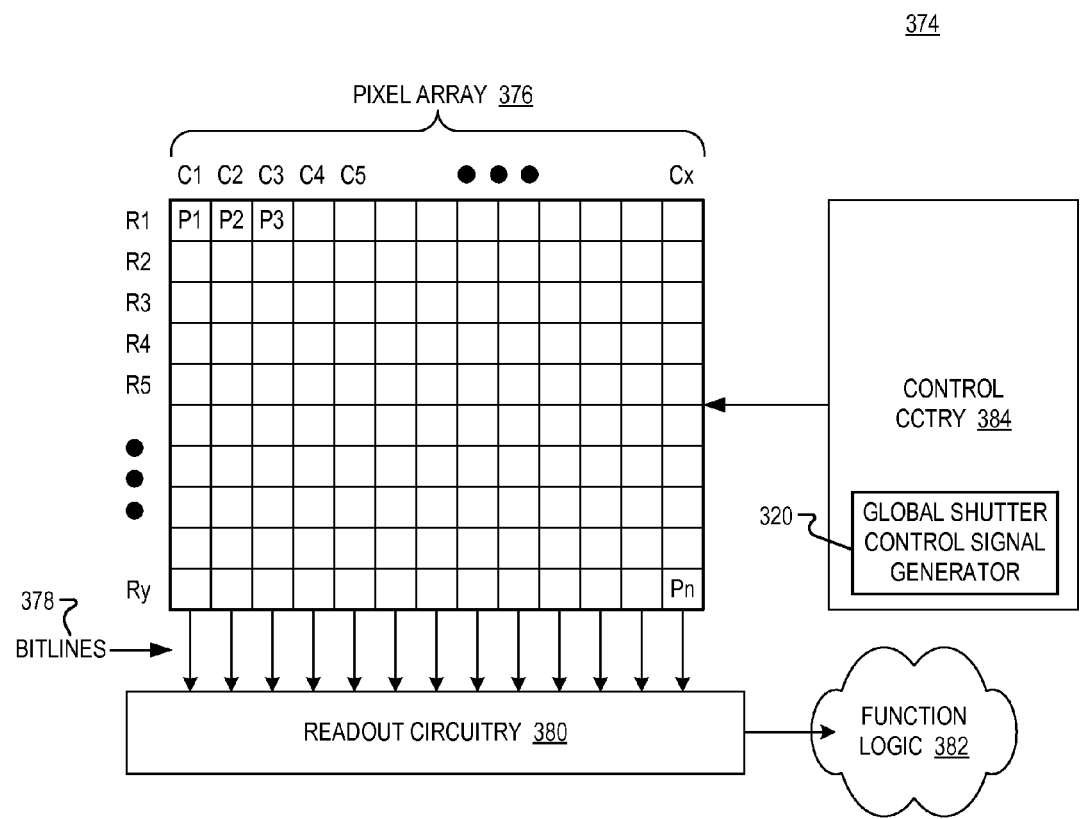
FIG. 3 is a diagram illustrating one example of an imaging system including a pixel array having pixel cells controlled with an example global shutter control signal generator in accordance with the teachings of the present invention.

FIG. 3 is a diagram illustrating one example of an imaging system 374 including a pixel array 376 having pixel cells controlled with an example global shutter control signal generator 320 included in control circuitry 384 in accordance with the teachings of the present invention. In the depicted example, it is appreciated that global shutter control signal generator 320 of FIG. 3 may be one of example of global shutter control signal generator 120 of FIG. 1 to generate global shutter control signal 126 or global shutter control signal 226 of FIG. 2, and that similarly named and numbered elements referenced below are coupled and function similar to as described above.

In particular, as shown in the example depicted in FIG. 3, imaging system 374 including an example pixel array 376 having a plurality of image sensor pixels cells. Imaging system 374 includes pixel array 376 coupled to control circuitry 384 and readout circuitry 380, which is coupled to function logic 382. In one example, pixel array 376 is a two-dimensional (2D) array of image sensor pixel cells (e.g., pixels P1, P2, P3, . . . Pn). It is noted that the pixel cells P1, P2, . . . Pn in the pixel array 376 may be examples of pixel cell 100 of FIG. 1. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell P1, P2, P3, . . . , Pn has been reset in response to the global shutter control signal generator 320, and has acquired its image data or image charge during a normal exposure operation as discussed above, the image data is readout by readout circuitry 380 through bitlines 378 and then transferred to function logic 382. In various examples, readout circuitry 380 may include amplification circuitry, analog-to-digital (ADC) conversion circuitry, or otherwise. Function logic 382 may simply store the image data or even manipulate the image data by applying post image effects (e.g., crop, rotate, remove red eye, adjust brightness, adjust contrast, or otherwise). In one example, readout circuitry 380 may readout a row of image data at a time along readout column lines (illustrated) or may readout the image data using a variety of other techniques (not illustrated), such as a serial readout or a full parallel readout of all pixels simultaneously.

In the depicted example, control circuitry 384 is coupled to pixel array 376 to control operational characteristics of pixel array 376. As discussed in detail above, control circuitry 384 includes global shutter control signal generator 320 to generate a global shutter control signal as well as other control signals to control image acquisition for each pixel cell included in pixel array 376. In the example, the global shutter control signal and other control signals simultaneously enable all pixels cells P1, P2, P3, . . . Pn within pixel array 376 to acquire image charge and transfer the image charge from each respective photodiode in the pixel cells during a single acquisition window in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A pixel cell, comprising:
a photodiode disposed in a semiconductor material to accumulate image charge in response to incident light directed to the photodiode;
a global shutter transistor disposed in the semiconductor material and coupled to the photodiode to selectively reset the image charge in the photodiode in response to a global shutter control signal; and
a global shutter control signal generator circuit coupled to generate the global shutter control signal to have a first value, a second value, and a third value, wherein the first value of the global shutter control signal is coupled to turn on the global shutter transistor to reset the photodiode, wherein the third value of the global shutter control signal is coupled to control the global shutter transistor to be in a low leakage off mode, wherein the second value of the global shutter control signal is between the first and third values of the global shutter control signal, and wherein the second value of the global shutter control signal is coupled to turn off the global shutter transistor.

2. The pixel cell of claim 1, wherein the global shutter transistor is coupled between a positive voltage source and the photodiode.

3. The pixel cell of claim 2, wherein the first value is a positive voltage, wherein the second value is substantially equal to zero volts, and wherein the third value is a negative voltage.

4. The pixel cell of claim 1, wherein the global shutter control signal generator circuit is coupled to generate the global shutter control signal to transition from the first value to the second value, and then after a delay of at least one row readout time of a pixel array including the pixel cell, transition from the second value to the third value to turn off the global shutter transistor to enable the photodiode to accumulate the image charge.

5. The pixel cell of claim 4, wherein the global shutter control signal generator circuit is coupled to generate the global shutter control signal to transition from the third value directly to the first value to reset the image charge in the photodiode.

6. The pixel cell of claim 1 further comprising a storage transistor disposed in the semiconductor material to store the image charge accumulated in the photodiode.

7. The pixel cell of claim 6 further comprising a transfer transistor disposed in the semiconductor material and coupled between the photodiode and the storage transistor to selectively transfer the image charge from the photodiode to the storage transistor.

8. The pixel cell of claim 7 further comprising an output transistor disposed in the semiconductor material and coupled to the storage transistor to selectively transfer the image charge from the storage transistor to a readout node.

9. The pixel cell of claim 8 wherein the readout node comprises a floating diffusion disposed in the semiconductor material.

10. The pixel cell of claim 8 further comprising:
a reset transistor disposed in the semiconductor material and coupled to the readout node;

an amplifier transistor disposed in the semiconductor material having an amplifier gate coupled to the readout node; and a row select transistor disposed in the semiconductor material coupled between a bitline and the amplifier transistor.

11. An imaging system, comprising:

a pixel array of pixel cells, wherein each one of the pixel cells includes:

a photodiode disposed in a semiconductor material to accumulate image charge in response to incident light directed to the photodiode;

a global shutter transistor disposed in the semiconductor material and coupled to the photodiode to selectively reset the image charge in the photodiode in response to a global shutter control signal; and a global shutter control signal generator circuit coupled to generate the global shutter control signal to have a first value, a second value, and a third value, wherein the first value of the global shutter control signal is coupled to turn on the global shutter transistor to reset the photodiode, wherein the third value of the global shutter control signal is coupled to control the global shutter transistor to be in a low leakage off mode, wherein the second value of the global shutter control signal is between the first and third values of the global shutter control signal, and wherein the second value of the global shutter control signal is coupled to turn off the global shutter transistor;

control circuitry coupled to the pixel array to control operation of the pixel array; and readout circuitry coupled to the pixel array to readout image data from the plurality of pixels.

12. The imaging system of claim 11 further comprising function logic coupled to the readout circuitry to store the image data from each one of the plurality of pixel cells.

13. The imaging system of claim 11, wherein the global shutter transistor is coupled between a positive voltage source and the photodiode.

14. The imaging system of claim 13, wherein the first value is a positive voltage, wherein the second value is substantially equal to zero volts, and wherein the third value is a negative voltage.

15. The imaging system of claim 11, wherein the global shutter control signal generator circuit is coupled to generate the global shutter control signal to transition from the first value to the second value, and then after a delay of at least one row readout time of a pixel array including the pixel cell, transition from the second value to the third value to turn off the global shutter transistor to enable the photodiode to accumulate the image charge.

16. The imaging system of claim 15, wherein the global shutter control signal generator circuit is coupled to generate the global shutter control signal to transition from the third value directly to the first value to reset the image charge in the photodiode.

17. The imaging system of claim 16 wherein the control circuitry is coupled to cause the global shutter control signal to simultaneously enable all of the photodiodes in the pixel array to accumulate the image charge.

18. The imaging system of claim 17 wherein the control circuitry is coupled to cause the global shutter control signal to simultaneously reset the image charge all of the photodiodes in the pixel array.

19. The imaging system of claim 11, wherein each one of the pixel cells further comprises:

a storage transistor disposed in the semiconductor material to store the image charge accumulated in the photodiode;

a transfer transistor disposed in the semiconductor material and coupled between the photodiode and the storage transistor to selectively transfer the image charge from the photodiode to the storage transistor;

an output transistor disposed in the semiconductor material and coupled to the storage transistor to selectively transfer the image charge from the storage transistor to a readout node;

a reset transistor disposed in the semiconductor material and coupled to the readout node;

an amplifier transistor disposed in the semiconductor material having an amplifier gate coupled to the readout node; and a row select transistor disposed in the semiconductor material coupled between a bitline and the amplifier transistor.

* * * * *